(12) United States Patent
Pearson et al.

(10) Patent No.: US 7,840,065 B2
(45) Date of Patent: Nov. 23, 2010

(54) METHOD FOR DERIVING CONSISTENT COLOR MEASUREMENTS

(75) Inventors: Christopher H. Pearson, Springboro, OH (US); Gary N. Bodnar, Springboro, OH (US)

(73) Assignee: Color Savvy Systems Limited, Springboro, OH (US)

( * ) Notice: Subject to any disclaimer, the term of this patent is extended or adjusted under 35 U.S.C. 154(b) by 802 days.

(21) Appl. No.: 11/776,635

(22) Filed: Jul. 12, 2007

(65) Prior Publication Data

US 2008/0013828 A1    Jan. 17, 2008

Related U.S. Application Data

(60) Provisional application No. 60/830,366, filed on Jul. 12, 2006.

(51) Int. Cl.
*G06K 9/00* (2006.01)
*H04N 9/73* (2006.01)
*G03F 3/08* (2006.01)

(52) U.S. Cl. .................................... 382/167; 348/223.1

(58) Field of Classification Search ................ 382/162, 382/164, 167, 168, 254, 286; 358/1.9, 504, 358/515, 518, 523, 530; 348/71, 180, 187, 348/188, 223.1, 276, 645, 658, E9.003, E9.01; 345/589, 590, 591, 600–604
See application file for complete search history.

(56) References Cited

U.S. PATENT DOCUMENTS

| | | | |
|---|---|---|---|
| 3,971,065 A | | 7/1976 | Bayer |
| 4,185,920 A | * | 1/1980 | Suga ........................... 356/406 |
| 4,812,904 A | * | 3/1989 | Maring et al. ................ 348/135 |
| 4,831,437 A | * | 5/1989 | Nishioka et al. .............. 348/71 |
| 5,150,199 A | * | 9/1992 | Shoemaker et al. ......... 348/180 |
| 7,057,641 B2 | | 6/2006 | Bodnar et al. |

(Continued)

FOREIGN PATENT DOCUMENTS

| | | |
|---|---|---|
| JP | 4337796 | 11/1991 |
| WO | 2006/058190 | 6/2006 |

OTHER PUBLICATIONS

Pratt, W.K., *Digital Image Processing*, Second Edition, John Wiley & Sons, Inc., pp. 171-191.

Vrhel, M.J., "Color Device Calibration: A Mathematical Formulation," *IEEE Trnasactions on Image Processing*, vol. 8, No. 12, pp. 1796-1806 (Dec. 1999).

International Search Report issued regarding International Application No. PCT/US07/73331 (Feb. 20, 2008).

Written Opinion of the International Searching Authority issued regarding International Application No. PCT/US07/73331 (Feb. 20, 2008).

(Continued)

*Primary Examiner*—Amir Alavi
(74) *Attorney, Agent, or Firm*—Thompson Hine LLP

(57) ABSTRACT

A method for measuring a color value such as brightness or intensity of a sample which comprises: measuring color values for a plurality of color standards using a reference color measurement device to obtain a matrix Y that contains the measurements of the color standards as measured by the reference color measurement device; measuring the same plurality of color standards with a field color measurement device to obtain a matrix X that contains the measurements of the color standards as measured by the field color measurement device; calculating a color correction matrix B based upon the equation Y=BX, measuring the color value for the sample with the field color measurement device, and applying the color correction matrix B to the reading of the sample color to obtain a sample color value that approximates that sample color value that would be obtained using the reference measurement device.

10 Claims, 4 Drawing Sheets

U.S. PATENT DOCUMENTS

| | | | |
|---|---|---|---|
| 7,218,358 B2 * | 5/2007 | Chen et al. | 348/658 |
| 7,636,473 B2 * | 12/2009 | Imai et al. | 382/167 |
| 7,728,845 B2 * | 6/2010 | Holub | 345/589 |
| 2004/0001210 A1 * | 1/2004 | Chu et al. | 358/1.9 |
| 2004/0179101 A1 | 9/2004 | Bodnar et al. | |
| 2004/0264767 A1 | 12/2004 | Pettigrew | |
| 2005/0146733 A1 | 7/2005 | Lohweg et al. | |
| 2006/0078199 A1 | 4/2006 | Bodnar et al. | |
| 2006/0078225 A1 | 4/2006 | Pearson et al. | |
| 2007/0146745 A1 * | 6/2007 | Bezryadin | 358/1.9 |
| 2008/0013828 A1 * | 1/2008 | Pearson et al. | 382/167 |

OTHER PUBLICATIONS

International Preliminary Report on Patentability, PCT/US2007/073331 (Jan. 13, 2009).

* cited by examiner

METHOD FOR DERIVING CONSISTENT COLOR MEASUREMENTS

CROSS REFERENCE TO RELATED APPLICATION

This application claims the benefit of U.S. Provisional Application No. 60/830,366, filed Jul. 12, 2006, the contents of which are hereby incorporated by reference.

BACKGROUND OF INVENTION

This invention is a method for processing data provided by an electronic image-capturing device in a way that makes it self-calibrating, and allows it to determine precise colors of a segment or segments of the captured image such that a plurality of such devices (Field devices) report consistent color measurements.

SUMMARY OF THE INVENTION

An electronic image capture device (typically a digital camera) captures an image of a target area of unknown color on an object along with reference colors (hereafter "Calibration Colors") that have been placed in its field of view in close proximity to the target area. Pre-determined color measurements have been made of the Calibration Colors, with data reported as separate intensity values for each color channel—typically red, green, and blue and sometimes black. These data are corrected mathematically, generating consistent intensity values in each color channel for the target area independently of the state of the imaging device and variations in the illumination of the target.

One embodiment of the invention measures skin color or hair color to assist in the selection of health and beauty products. Another embodiment measures colors of a home decor product to assist in the selection, make recommendations and/or assess the compatibility of various products.

The device is placed against area where a color measurement is to be made (the "target") and pixel values are collected from each color channel from the target area and reference colors. These data are processed in software to determine the color of the target area. The software can then either report the color or do further processing to identify the product with the best color match, recommend what coloring products & processes to use to achieve a target color, assess compatibility with a second color measured in a similar way, recommend other colors that would be compatible with the measured color or predict and/or simulate (present a visual representation of) the result when a particular product is selected.

DETAILED DESCRIPTION

Operational Overview

In one embodiment, an image capture device, typically a digital imaging chip, is used. Such a device generally treats an image as a set of points arranged in a two-dimensional matrix (pixels). In one embodiment to capture color, the light at each pixel is passed through a filter that allows typically only the red, the green or the blue components of the light to pass. In this configuration, the two-dimensional array of pixels is overlaid with a two-dimensional array of red, green and blue filters arranged in a regular pattern to ensure that color information is captured evenly across the image. Typically an imaging device/system organizes its array of pixels in rows of green and red-sensitive pixels, alternating with rows of blue and green-sensitive pixels as described by Bayer, et. al. in U.S. Pat. No. 3,971,065. The device provides numeric readings that are proportional to the intensity of light passing through the filter and falling upon each pixel.

Figure 4:
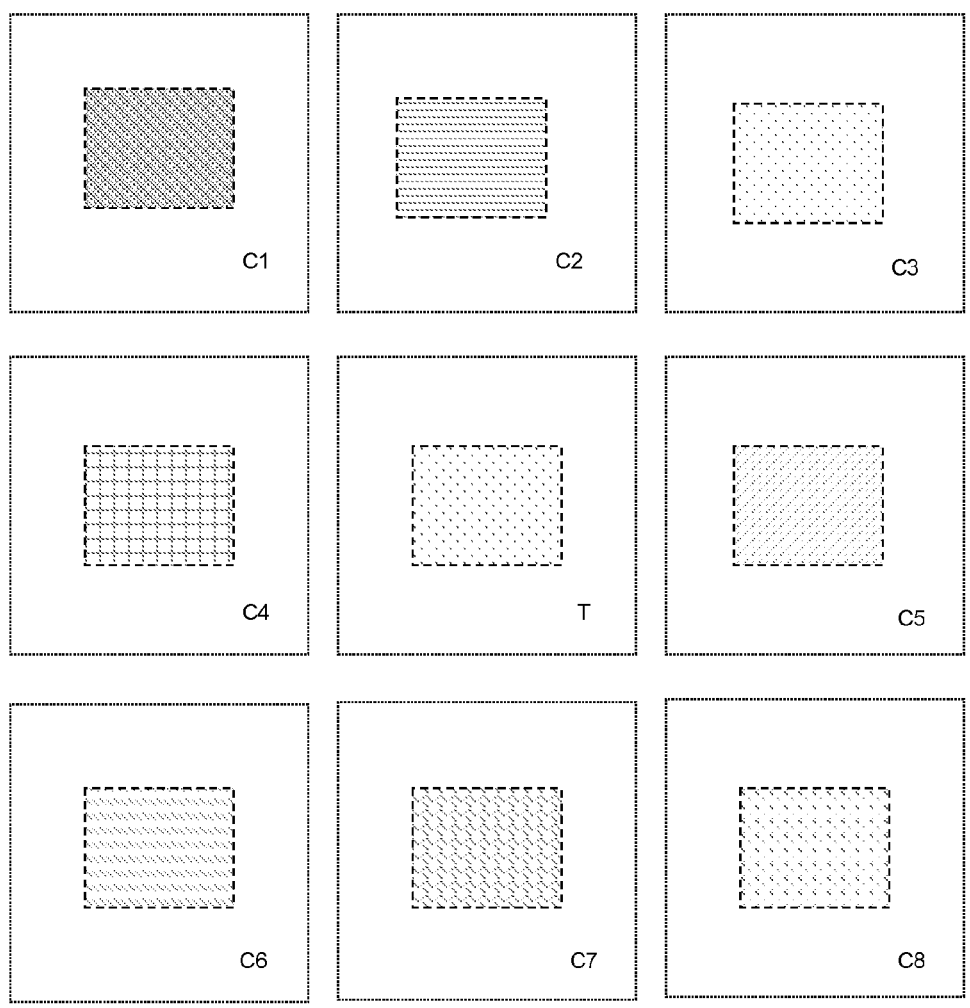
FIG. 4 is a schematic illustration of one example of an arrangement of eight calibration colors about a central target color.

The image capture device, as used in one embodiment of this invention, captures an image of a set of fixed reference colors (Calibration Colors) and an unknown color for which a measurement is desired (target region) as described in U.S. Pat. No. 7,057,641. The fixed references are used to make a series of adjustments to the measurement data that correct for differences between individual devices and changes to the state of a device (including changes in the illumination of the target), all to ensure uniform performance—both within the device (repeatability) and across multiple devices (consistency) as explained later. The fixed references may include as few or as many color samples as desired, but two e.g., a black and a white, have been found to be generally adequate in some embodiments. FIG. 4 illustrates an embodiment in which eight Calibration Colors are arranged around a target color. It will be noted that the Calibration Colors are contained within the unit. As such, the intensity of the Calibration Colors in the Reference device and the Field device will be inherently different, e.g, different devices are inherently subject to differences in illumination and other conditions.

Figure 3:
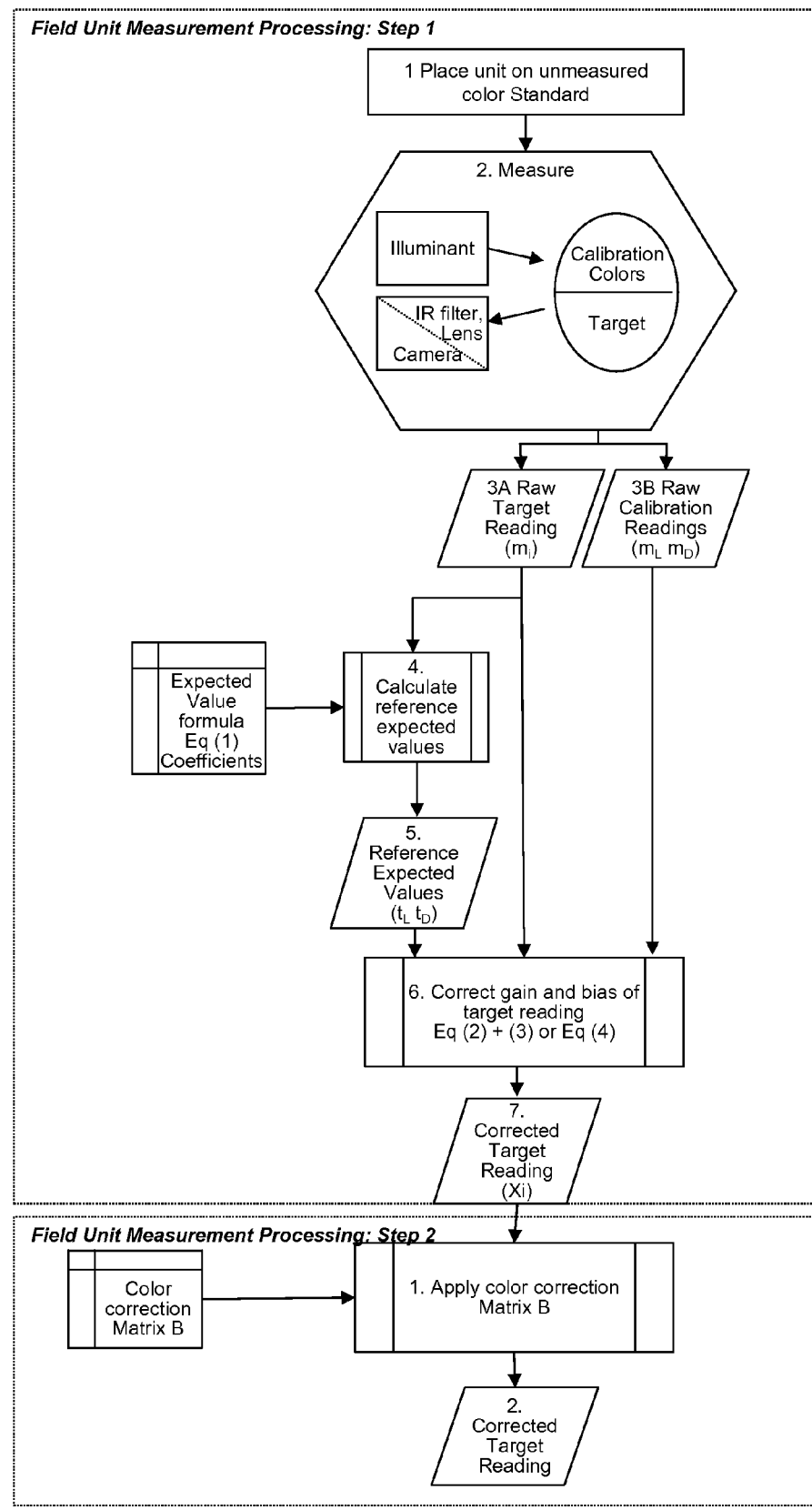
FIG. 3 is a flow chart illustrating field unit measurement processing.

To provide a plurality of Field devices that will each report consistent results, a "Reference" performance must be defined. This may be based on performance of a different device, a similar device or devices, and/or a standard predicted performance specification. Field devices are then built to mimic or achieve the performance of the Reference device. If a similar device is to be used as the Reference device, the steps required to set up the Reference device are outlined in FIG. 3 below, followed by a detailed description of each step.

Figure 1:
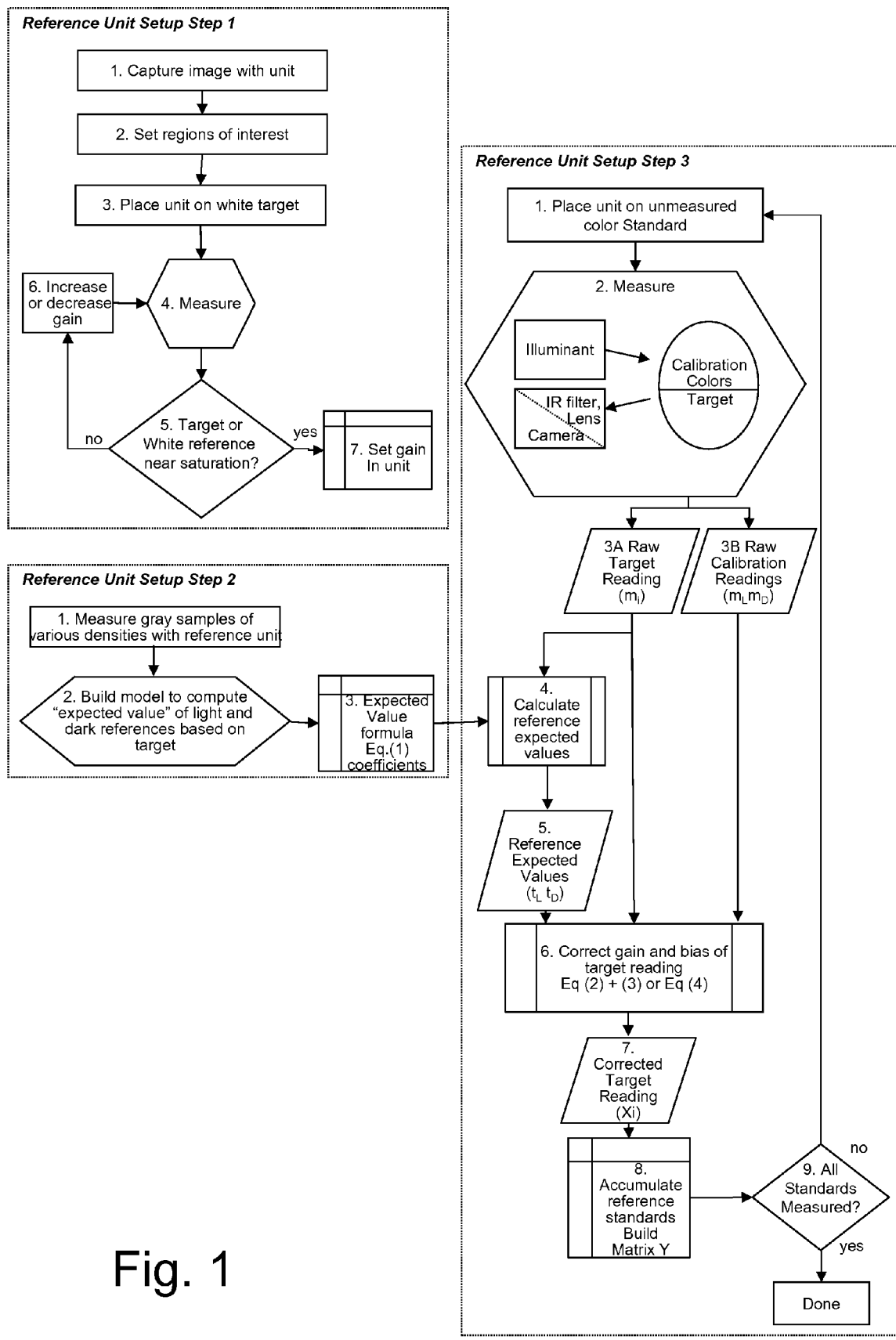
FIG. 1 is a flow chart illustrating the reference unit set up steps.
Figure 2:
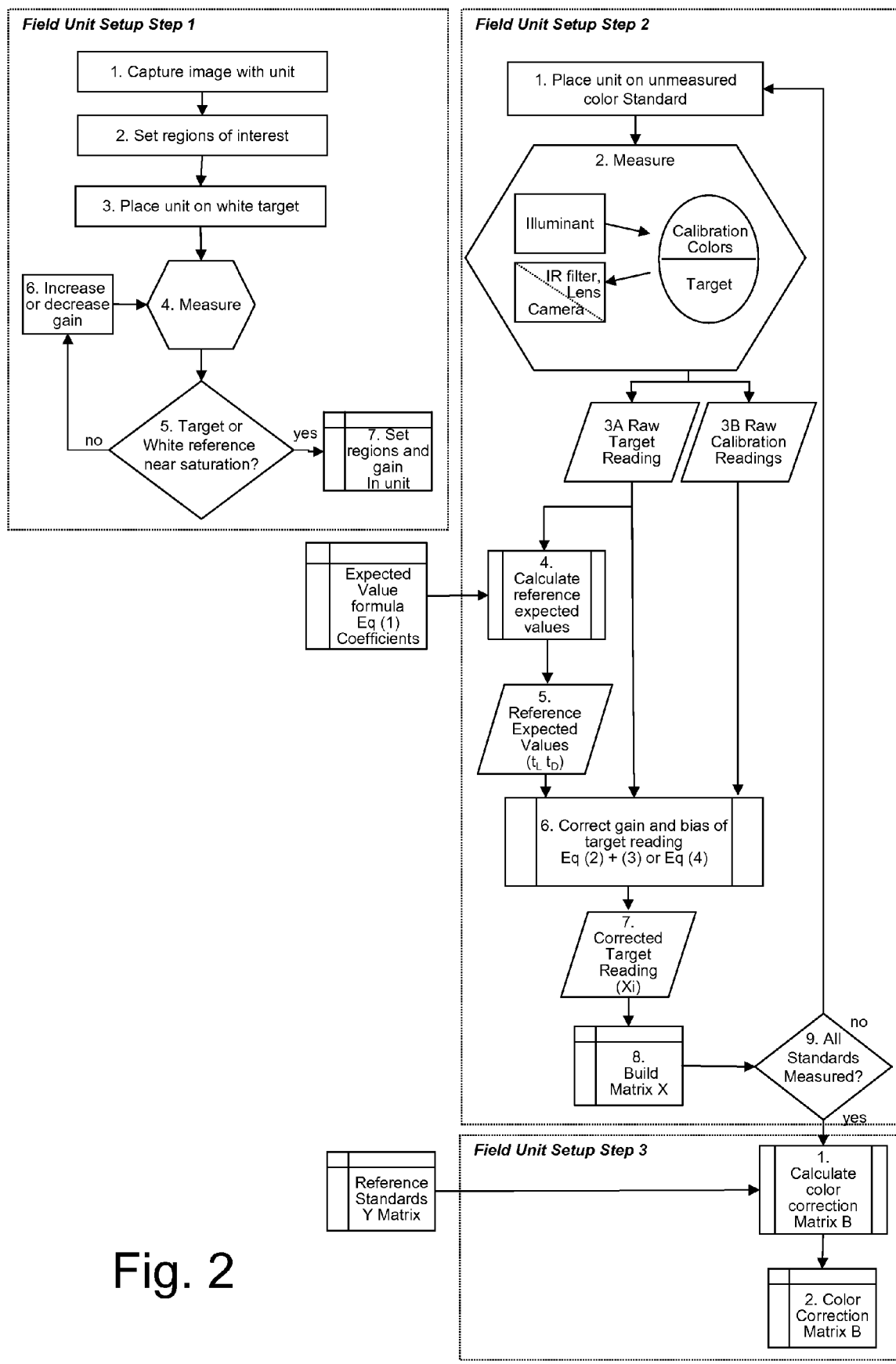
FIG. 2 is a flow chart illustrating the process for setting up and profiling a field unit.

To build a Field device that mimics (e.g., provides consistent color measurements with) the Reference device, first a series of "Setup Steps" is conducted to profile the performance of the Reference device and capture its unique performance characteristics. The steps required to set up a reference unit are shown in FIG. 1. The steps required to set up and profile a Field device are outlined in FIG. 2.

During operation, raw data (i.e., unprocessed, uncorrected and unadjusted data) is collected from the target area that contains the color for which a color measurement is desired, and also Calibration Colors contained within the unit. These data are used in conjunction with data collected and derived during the Setup Steps to make a series of adjustments to the raw target data provided by the Field device such that the Field device measurement is consistent with the Reference device measurement.

The result of these adjustments is typically a set of red, green and blue values for the unknown color in the target area that, for any given target color, remain largely consistent regardless of changes within the device and largely consistent from one Field device to another. Optionally, using standard device characterization techniques, the resulting values can be further transformed to an industry standard color space like CIE X, Y, Z, or CIELAB. See M. J. Vrhel and H. J. Trussell, "Color Device Calibration: A Mathematical Formulation" I.E.E.E. Transactions on Image Processing, Vol. 8, No. 12, 1796-1806, December 1999; and W. K. Pratt, *Digital Image Processing*, John Wiley & Sons, NY, 1991, pp 171-191. These Operational adjustments are summarized in the flowchart shown as FIG. 2.

Reference Unit Setup Step 1: Unit Setup

As described in U.S. Pat. No. 7,057,641 and as shown in FIG. 4, the image captured by the Reference device will include fixed calibration color(s) and an unknown target color. Segments or areas of Interest are defined that identify where each of these colors can be found within the overall image. Operation (2) of Setup Step 1, shown in FIG. 1, defines these segments of interest.

To set the segments of interest, an entire image is collected from the imaging device (1). Once collected, the image is displayed on a screen, and the specific points (pixels) within the image that contain each of the segments of interest identified (Operation 2). FIG. 4 below shows one such image including eight different Calibration Colors C1-C8, in which the squares indicate the segments of interest, and a target color T. The process by which a color intensity reading is taken is described in U.S. Published Patent Applications 2006-0078225A1 and 2006-0078199A1. In summary, the device is placed such that a Color Standard is in the target region window (Operation 1), the illumination activated, and the pixel values in the segments of interest are collected (Operation 2). Several sets of pixel values may be averaged together to reduce unwanted electronic noise and variability (Operation 3).

A region 20 pixels wide and 20 pixels tall has been found to be adequate to capture reasonable samples of each color and average out electronic noise but other dimensions can be used as described in U.S. Pat. No. 7,057,641 for each segment of interest. When taking measurements with the device, these will be the only pixels of interest, all others will be ignored.

A typical electronic image capturing device employs various parameters that can be set to conFig. the device based on the environment in which the images will be captured. These adjust the sensitivity of the device, typically by allowing the shutter width/exposure time and the electronic amplification/gain of the electronics to be set. The gain may be set globally for all channels, or may be set for individual channels (typically red, green, blue). Another purpose of Setup Step 1 in FIG. 1 is to set these parameters-and particularly the gain (operation 6).

Setting the specific parameters for each device will depend on the device, but in general, the shutter width/exposure time should be set as long as practical to give the image capture device as much exposure to the segments of interest as possible. These adjustments are made to extend or maximize the output range of the images so that it is sensitive to dark shades but will not saturate or overload on bright samples.

For many imagers, minimizing gain and maximizing exposure may not provide enough sensitivity. In many cases it is desirable to maximize the exposure setting and to increase the gain until the sensitivity range of the device is maximized.

Once shutter width/exposure is set, then the electronic amplification/gain should be set to ensure that the lightest, brightest color to be measured (typically a spectrally neutral, high reflectance white) will not overload (saturate) the electronics. This ensures that the full range of the image capture device is being used (which maximizes the devices ability to resolve different colors) and that a full range of colors can be measured without overloading the device. For example, if the electronics of the device are designed to return an 8 bit number (0 to 255) representing the intensity/brightness of each pixel, the electronic gain/saturation should be set so a very light, bright color returns values at or below 255. In practice, it has been found that setting the electronic amplification/gain such that a bright white sample returns a value approximately 90% of the maximum (230 in the example above) allows for potentially brighter colors to be measured, and avoids forcing the image capture device to work at its limits where its performance may not be entirely linear.

Typically the electronic amplification/gain can be set by collecting data from the segments of interest with a bright white in the target region (Operations 2-7). Each pixel in each segment is evaluated to determine whether the pixel returning the highest value, returns a number at or below the desired set point (e.g., 230 in the example above). If not, the gain is increased or decreased and data from the Segments of Interest collected again (Operations 5 and 6). This process continues until all pixels are at or below the desired set point.

Once the segments of interest have been defined, and the shutter width and gain determined, these parameters are stored (typically in the electronic memory of the device) to allow them to be used each time a measurement is taken (Operation 7).

Reference Unit Setup Step 2: Build Expected Value Model

The color of the unknown target will affect the measured value of the Calibration Colors. For example, the reference values are higher when the target is light and smaller when the target is dark. To ensure stable, consistent performance, this effect must be modeled in a way that allows a predicted or expected value (Expected Value) to be calculated for the Calibration Colors in the device, based on the color measured in the unknown/target area. By measuring several samples in the target area that range from dark to light (Operation 1), one can determine how the Calibration Color values are influenced by the target—(Operation 2).

In one embodiment, a simple linear model is used to predict the Expected Value of the Calibration Colors based on the target color. This model can be expressed as a first order equation such as:

$$t_c = a_c m_c + b_c \tag{1}$$

Where:
  c One of the imager's color channels(e.g., red, green or blue.
  $t_c$ The Expected Value of a Calibration Color for channel c
  $m_c$ The Measured Value of the target color for channel c
  $a_c$ The first order coefficient for channel c
  $b_c$ The constant coefficient for channel c Thus, in one embodiment, the Expected Value is based on a linear equation relating the measured color to expected color measurement for each color channel.

By taking a series of readings with a measurement device, capturing the average pixel values in each channel for the Calibration Colors, and the average pixel values in each channel for the target color (Operation 1), a linear regression will determine values for m and b in Equation (1) (Operation 2). In practice, measuring a set of six to ten grays of varying densities as targets has been found to be adequate to generate a reasonable set of coefficients.

Once the Expected Value coefficients (a and b in Equation (1)) have been determined, they may be stored (typically in the electronic memory of the device) to allow them to be used each time a measurement is taken (Operation 3).

Reference Unit Setup Step 3: Measure Reference Color Standards

A set of Color Standards is chosen that will be used to characterize the Reference and Field devices. When a Field device is built and characterized, its performance will be adjusted to make it match as closely as possible the characteristics of the Reference device. The Color Standards should typically include the broadest possible array of colors, including a wide variety of hues—both light and dark. The number of Color Standards will determine the degree to which the performance of a Field Unit will match a Reference Unit. A typical set of Color Standards might include between 10 and 50 colors to ensure full coverage of the color spectrum.

Once the Color Standards have been selected, they are each read and processed by the Reference Unit to create a set of Reference Measurements.

The process by which a reading is taken is described in patent applications Ser. No. 11/128,881 filed May 13, 2005 and Ser. No. 11/201,854 filed Aug. 11, 2005 as previously noted.

Once raw average pixel values have been determined for each channel (typically red, green and blue) in each segment of interest, these data must be processed to ensure consistency from reading to reading as environmental, electronic, optical and other conditions change.

First, the Expected Value of each of the Calibration Colors is determined in Operation 4 from the model built in Reference Unit Setup Step 2 (Operation 3) above. The average pixel values from the target area are fed into the equation 1 developed above, and the result is an Expected Value for each channel in each of the Calibration Color segments of interest (Operation 5). It will be noted that the only input to equation 1 is the measured value for the target color channel. Hence, the output of equation 1 is a predicted value for the Calibration Colors based upon the effect of the target color in the target area. The co-efficients for equation 1 are the output from Operation 3 in Setup Step 2.

The measurements of the Calibration Colors as measured by the Field Unit device that uses a typical red-green-blue image capture device are represented by the 3×m matrix X, where m is the number of Calibration Colors. The correction calculation process involves fitting the Field Unit's Calibration Color measurements to the Reference Unit's measurements and yields a correction matrix B such that equation 2 is true, where Y is the matrix containing the measurement of the Calibration Colors as measured by the Reference device and calculated in Operation 4 and accumulated in Operation 8

$$Y = BX \qquad (2)$$

There are many ways to solve for B. A common method is referred to as matrix linear regression as shown in Equation (3).

$$B = [X^T X]^{-1} X^T Y \qquad (3)$$

Once the correction matrix B has been calculated, it is applied to the pixel values from the target segment of interest as shown in the Equation (2) (Operation 5).

Equations 2 and 3 are used to adjust the Calibration Colors for the Reference Unit when there more than two Calibration Colors. However, only two Calibration Colors are required and the correction of the predicted Calibration Colors can be simplified by application of Equation (4) below.

Operation 6 is embodied in Equation (4). It uses both the expected value of the reference and the actual value of the references to correct the target measurement. It scales the target to same state as existed in the Reference unit at the time the data was collected for the expected value equation. In one embodiment as few as two Calibration Colors are used—one light and one dark. In this case the correction reduces to a much simpler linear scaling. Two of the measurements from the device as represented by the vectors $m_L$ and $m_D$ contain the measured red, green and blue channel values for the light and dark Calibration Colors respectively. The vectors $t_L$ and $t_D$ are the expected values of the red, green and blue channel values for the light and dark Calibration Colors respectively. The target measurements $m_i$ can be corrected using the following Equation (4).

$$x_i = \left(\frac{m_i - m_D}{m_L - m_D}\right) \times (t_L - t_D) + t_D \qquad (4)$$

In equation 4, $m_i$ is the instantaneous measurement for unknown target color i. The vectors $t_L$ and $t_D$ are calculated using $m_i$ and equation 1. The vector $x_i$ is the corrected target measurement. Suppose the target measured exactly the same as the dark reference. ($m_T - m_D$). In that case, the result of equation 4 becomes simply $t_D$ or the expected value of the dark reference. (The term $m_T - m_D$ is zero leaving only the $t_D$ term). Suppose, that the target measured exactly the same as the light reference ($m_T - m_L$). In that case, the result of equation 4 becomes $t_L$ or the expected value of the light reference. Thus, we are scaling the target around those expected values and correcting out any other influences. The result of this equation are measurements that are stable and repeatable. All of the operations are performed on a channel-by-channel basis (e.g., in a typical red-green-blue device, the R, G, and B channels are each calculated independently). Operation 6 in Setup Step 3 involves the application of Equation (4) to the predicted Calibration Color values on a channel-by-channel basis. As shown in FIG. 1, there are three inputs to Operation 6, namely, $t_L$ and $t_D$ from Operation 5, $m_i$ from Operation 3A (Raw Direct Reading) and $m_L$ and $m_D$ from Operation 3B (Raw Calibration Color Readings). Operation 6 yields the corrected target reading for each standard on a channel-by-channel basis. These corrected readings are accumulated for all of the Reference Colors to yield the matrix Y used in Equation (5) below.

Once these corrections are made to an individual Color Standards, its values are recorded per channel for future reference (Operation 8), and the next Color Standards is measured (Operations 9 and 1). This process continues until all Color Standards have been measured.

Field Unit Setup Step 1: Unit Setup

Unit Setup Step 1 for a Field unit is the same as Unit Setup Step 1 for a Reference Unit described earlier.

Field Unit Setup Step 2: Measure Reference Standards

To profile the color characteristics of a Field unit, a set of color readings is taken and the data accumulated. The colors measured are the same as those measured by the Reference device to create the Reference Color Standards.

Each of these measurements is processed and recorded as in the Reference Unit Setup Step 3. The Calibration Colors are predicted based upon coefficients that are obtained in the same manner as Reference Units Setup Step 2 using the Calibration Colors contained in the Field device, and using the Field device to make the measurements.

Field Unit Setup Step 3: Calculate Color Correction Matrix.

Once all of the Reference Color Standards have been measured with the Field device and the data processed, the Color Correction Matrix is determined in Operation 1. This matrix is used to force the Field device to fit the performance of the Reference device.

Operation 6 in Field Unit Setup Step 2 is conducted analogous to Operation 6 in Reference Unit Setup Step 3. The inputs for Operation 6 are $t_L$ and $t_D$ obtained via Operations 3, 4 and 5, $m_i$ obtained by Operation 3A and $m_L$ and $m_D$ obtained from Operation 3B using the Field unit and Equation (4). If more than two Calibration Colors are involved, Equations (2) and (3) may be used as discussed earlier.

In the same manner as Reference Unit Setup Step 3, each of the Color Standards is measured and corrected on a channel-by-channel matrix using the Expected Value coefficients in Operation 4 and Equation (4) in Operation 6 as discussed above. When all of the Reference Standards have been measured with the Field Units, the values are accumulated in Operation 8 and matrix X' is output for use in Equation (5).

The Color Correction Matrix contains the coefficients of a set of simultaneous equations that use the Field Unit's channel measurements to calculate the equivalent Reference Unit channel values. The goal of this step is to create a correction matrix that generates a set of calculated values for the Reference Standards Colors that is as close as possible to the Reference Standard Colors as measured by the Reference Device. In matrix notation the equation looks like the following:

$$Y'=BX' \qquad (5)$$

Where:
X' contains the measurements of the Reference Standard Colors as measured by a Field Unit
B is the Color Correction Matrix
Y' contains calculated Reference Unit values The size of each matrix depends on the number of channels in the imager and the type of simultaneous equations being solved. For example if the imager has 3 channels, a red, a green and a blue, then the matrix Y would be a 3×n matrix where n is the number of measured colors. Further, if the simultaneous equations were first order in nature then the matrix X would also be a 3×n matrix and the Color Correction Matrix would be 3×3.

One embodiment uses first order equations with a constant term such that X is a 4×n matrix where 3 of the 4 columns are the red, green and blue corrected values respectively and the $4^{th}$ column is unity. It follows then that the Color Correction Matrix B is a 3×4 matrix.

There are only practical limitations on the type of simultaneous equations used. If computationally feasible, they could be of higher order and include cross terms such as the red channel multiplied by the green etc.

No matter what type of equations are used, B must be determined. There are many ways to solve for B. A common method is referred to as matrix linear regression as shown in Equation (6).

$$B=[X^TX]^{-1}X^TY \qquad (6)$$

Once the color correction matrix B has been determined in Operation 1 for the Field Unit, it should be stored (typically in the electronic memory of the device) to allow it to be used each time a measurement is taken by the Field Unit (2).

Field Unit Measurement Processing Step 1: Calibration Correction

To make a measurement using the Field Unit, the unit is placed on an unmeasured color. The image of the unmeasured color and the Calibration Colors is captured as described above for the Reference Unit Setup Step 3 and, more particularly, Field Unit Setup Step 2 (Operation 2). The Calibration Colors and the target color are red as described in U.S. patent application Ser. Nos. 11/128,881 and 11/201,854. The representative values for the Calibration Colors are adjusted using the coefficients described above in Operation 4. Operation 6 then is conducted using these reference values and the readings as described with respect to FIGS. 1 and 2. The output is a corrected target reading. In order to fit this reading to the Reference Unit, the correction matrix is applied using Equation (7) in Operation 1 of step 2. This results in a target reading that fits the Reference Unit.

Having described the invention in detail, it will be apparent that numerous modifications and variations are possible without departing from the spirit and scope of the following claims.

Field Unit Measurement Processing Step 2: Color Correction

Once the target readings have been corrected using data from the Calibration Color References, the color correction matrix B calculated during Field Unit Setup Step 3 is applied to the result (Operation 1). Calibrated target readings from each channel are processed through this set of simultaneous equations as shown in equation $$x=Bu \qquad (7)$$

In Equation (7), B is the color correction matrix as derived in Field Unit Setup Step 3, u is the vector representing (typically red, green and blue) values for the unknown color in the target region, and x is the vector containing the color corrected result (Operation 1).

This result can then be reported by the device (by any means) as the measurement of the unknown target color or processed further (Operation 2).

In practice, the setup processes for Reference and Field Units are best implemented on a personal computer (PC). Typically, any images or pixel values resulting from a measurement would be electronically transmitted to a PC for analysis and processing. The device may do some averaging, and/or strip out all but the pixels from the Segments of Interest, but the remainder of the processing is best accomplished on a PC—whether in custom-designed programs or readily available tools like spreadsheets.

The reference data (e.g., Expected Value coefficients, Color Correction Matrix coefficients, etc.) need to be stored in the device in a readily accessible location (memory), and structures for containing these data, as well as the means to install such data once it is calculated must also be developed.

Once these data are available, the processing of measurements, can be done by a processor internal to the device, and results created without any external connections or processing.

Reference Unit Setup is typically accomplished by gathering the relevant data from the reference unit, and using one or more custom-developed computer programs to perform each step. As measurements of Reference Standards are gathered, they can be processed either internally by the measurement device or externally. They are typically stored in a computerized database for use as Field Units are built and characterized.

Similarly, Field Unit Setup is typically accomplished by gathering the relevant data from the reference unit, and using one or more custom-developed computer programs to perform each step. As measurements of Reference Standards are gathered, they can be processed either internally by the measurement device or externally. The resulting Color Correction Matrix would typically be recorded in the memory of the Field Unit Device for use as measurements are taken.

Field Unit Measurements can be taken and processed internally by the measurement device or externally based on "raw" pixel values supplied by the device.

The invention having now been fully described, it should be understood that it might be embodied in other specific forms or variations without departing from its spirit or essential characteristics. Accordingly, the embodiments described above are to be considered in all respects as illustrative and not restrictive, the scope of the invention being indicated by the appended claims rather than the foregoing description, and all changes which come within the meaning and range of equivalency of the claims are intended to be embraced therein.

What is claimed is:

1. A method for measuring a color value such as brightness or intensity of a sample which comprises:
    measuring color values for a plurality of color standards using a reference color measurement device to obtain a matrix Y that contains the measurements of the color standards as measured by the reference color measurement device;
    measuring the same plurality of color standards with a field color measurement device to obtain a matrix X that contains the measurements of the color standards as measured by the field color measurement device;
    calculating a color correction matrix B based upon the equation Y=BX,
    measuring the color value for the sample with the field color measurement device, and
    applying the color correction matrix B to the reading of the sample color to obtain a sample color value that approximates that sample color value that would be obtained using the reference measurement device.

2. The method of claim 1 wherein the reference color measurement device includes calibration colors and the method includes the additional step of determining the effect of the sample on the measurement of the calibration colors.

3. The method of claim 2 wherein the field color measurement device includes at least two calibration colors and the method includes the additional step of determining the effect of the sample on the measurement of the calibration colors in the field color measurement device.

4. The method of claim 3 wherein the method includes the additional step of correcting the calibration color measurements for the effects of the sample.

5. The method of claim 4 wherein the method includes the step of correcting the sample color value based upon Equation (2) or Equation (4).

6. The method of claim 5 wherein there are two calibration colors and Equation (4) is used to correct the sample color.

7. The method of claim 6 wherein the matrix X is determined using the steps of correcting the value for each color standard reference using Equation (2) or Equation (4).

8. The method of claim 7 wherein the matrix Y is determined using the steps of correcting the value for each color standard reference using Equation (2) or Equation (4).

9. The method of claim 8 wherein the method includes the additional steps of initially adjusting the gain for each of the field and reference measurement devices.

10. The method of claim 4 wherein the step of correcting employ Equation (1).

* * * * *